US012769588B2

(12) United States Patent
Cho et al.

(10) Patent No.: US 12,769,588 B2
(45) Date of Patent: Oct. 20, 2026

(54) COMPUTING RESOURCE ASSIGNMENT IN SHARED RESOURCE COMPUTING SYSTEMS

(71) Applicant: QUALCOMM Incorporated, San Diego, CA (US)

(72) Inventors: Haeyoon Cho, Goyang-si (KR); Jijoong Kim, Seoul (KR); Hyun-Mook Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/442,226

(22) Filed: Feb. 15, 2024

(65) Prior Publication Data

US 2025/0265126 A1 Aug. 21, 2025

(51) Int. Cl.
*G06F 9/50* (2006.01)
*G06N 20/00* (2019.01)

(52) U.S. Cl.
CPC ........... *G06F 9/5055* (2013.01); *G06N 20/00* (2019.01)

(58) Field of Classification Search
CPC .. G06F 9/45533; G06F 9/45558; G06F 9/505; G06T 1/20; G06T 15/005
See application file for complete search history.

(56) References Cited

U.S. PATENT DOCUMENTS 9,886,311 B2 * 2/2018 Miller ................... G06F 9/5033
11,537,439 B1 * 12/2022 Liberty ................. G06F 9/4881
11,651,470 B2 * 5/2023 Zad ....................... G06F 9/5072 345/504
12,591,457 B1 * 3/2026 Murthy ..................... G06F 9/50
2023/0289231 A1 * 9/2023 Wang .................. G06F 11/3409

OTHER PUBLICATIONS

Weng Q., et al., "MLaaS in the Wild: Workload Analysis and Scheduling in Large-Scale Heterogeneous GPU Clusters", 19th Usenix Symposium on Networked Systems Design and Implementation, Apr. 4-6, 2022, 17 Pages.

(Continued)

*Primary Examiner* — Andy Ho

(74) *Attorney, Agent, or Firm* — Patterson + Sheridan LLP

(57) ABSTRACT

Techniques and apparatus for improved computing resource allocation are provided. In an example method, a first machine learning training (MLT) job awaiting assignment to computational resources is identified, the computational resources comprising a plurality of processor components. A first resource utilization of the first MLT job is determined, and a second resource utilization of a second MLT job being executed by one or more processor components of the plurality of processor components is determined. In response to determining that an aggregate of the first resource utilization and the second resource utilization is below a capacity of the one or more processor components, the first MLT job is assigned to the one or more processor components, where the first MLT job and the second MLT job share the one or more processor components, and the first MLT job is dispatched for execution using the one or more processor components.

20 Claims, 9 Drawing Sheets

(56) References Cited

OTHER PUBLICATIONS

Xiao W., "Gandiva: Introspective Cluster Scheduling for Deep Learning", 13th Usenix Symposium on Operating Systems Design and Implementation (OSDI '18), Oct. 8-10, 2018, 17 Pages.
Hu Q., et al., "Lucid: A Non-intrusive, Scalable and Interpretable Scheduler for Deep Learning Training Jobs", Proceedings of the 26th ACM International Conference on Hybrid Systems: Computation and Control, ACMPUB27, New York, NY, USA, Jan. 27, 2023, pp. 457-472, XP059068723, DOI: 10.1145/3575693.3575705, ISBN: 979-8-4007-0033-0, p. 1-p. 8, figure 4.
International Search Report and Written Opinion—PCT/US2025/0114086—ISAEPO—Apr. 4, 2025.
Xiao W., et al., "Gandiva: Introspective Cluster Scheduling for Deep Learning", 13th Usenix Symposium on Operating Systems Design and Implementation, The Advanced Computing Systems Association, Oct. 8, 2018, pp. 602-617, XP061026297, pp. 595-610, p. 1-p. 9, figures 6,7.
Zhu X., et al., "Vapor: A GPU Sharing Scheduler with Communication and Computation Pipeline for Distributed Deep Learning", 2021 IEEE Intl Conf on Parallel & Distributed Processing with Applications, Big Data & Cloud Computing, Sustainable Computing & Communications, Social Computing & Networking (ISPA/BDCLOUD/SOCIALCOM/SUSTAINCOM), IEEE, Sep. 30, 2021, pp. 108-116, XP034056475, Retrievd from DOI: 10.1109/ISPA-BDCLOUD-SOCIALCOM-SUSTAINCOM52081.2021.00028 on Dec. 8, 2021, p. 1-p. 7, figures 3,4,7.

* cited by examiner

COMPUTING RESOURCE ASSIGNMENT IN SHARED RESOURCE COMPUTING SYSTEMS

INTRODUCTION

Aspects of the present disclosure relate to computing resource allocation.

A wide variety of machine learning models have been trained for a similarly vast assortment of tasks in recent years. Training machine learning models often involves performing multiple iterations of processing data using the model, computing losses, and updating the model parameters. In many cases, this training process is resource-intensive, relying on (or at least benefiting substantially from) significant computational resources (e.g., memory, compute, and the like). In some conventional systems, some (or all) of the training processing is offloaded to hardware accelerators, such as graphics processing units (GPUs). Such accelerators are often able to perform the relevant computations more quickly and efficiently than the conventional hardware (e.g., a central processing unit (CPU)), but are also often relatively expensive.

In some conventional systems, therefore, such computing resources are often shared among tenants, entities, users, or operations. For example, multiple applications or users may request time on one or more GPUs in a shared cluster. Allocating the resources in these shared systems presents a challenge which, if not effectively solved, can cause catastrophic results. For example, poor allocation may result in out-of-memory errors, resulting in crashes that often cause all of the data being processed to be lost. Similarly, poor allocations may cause substantial reductions in throughput, causing the jobs to be performed far less efficiently than possible.

BRIEF SUMMARY

Certain aspects of the present disclosure provide a processor-implemented method, comprising: identifying a first machine learning training (MLT) job awaiting assignment to computational resources, the computational resources comprising a plurality of processor components; determining a first resource utilization of the first MLT job; determining a second resource utilization of a second MLT job being executed by one or more first processor components of the plurality of processor components; in response to determining that an aggregate of the first resource utilization and the second resource utilization is below a capacity of the one or more first processor components, assigning the first MLT job to the one or more first processor components, wherein the first MLT job and the second MLT job share the one or more first processor components; and dispatching the first MLT job for execution using the one or more first processor components.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
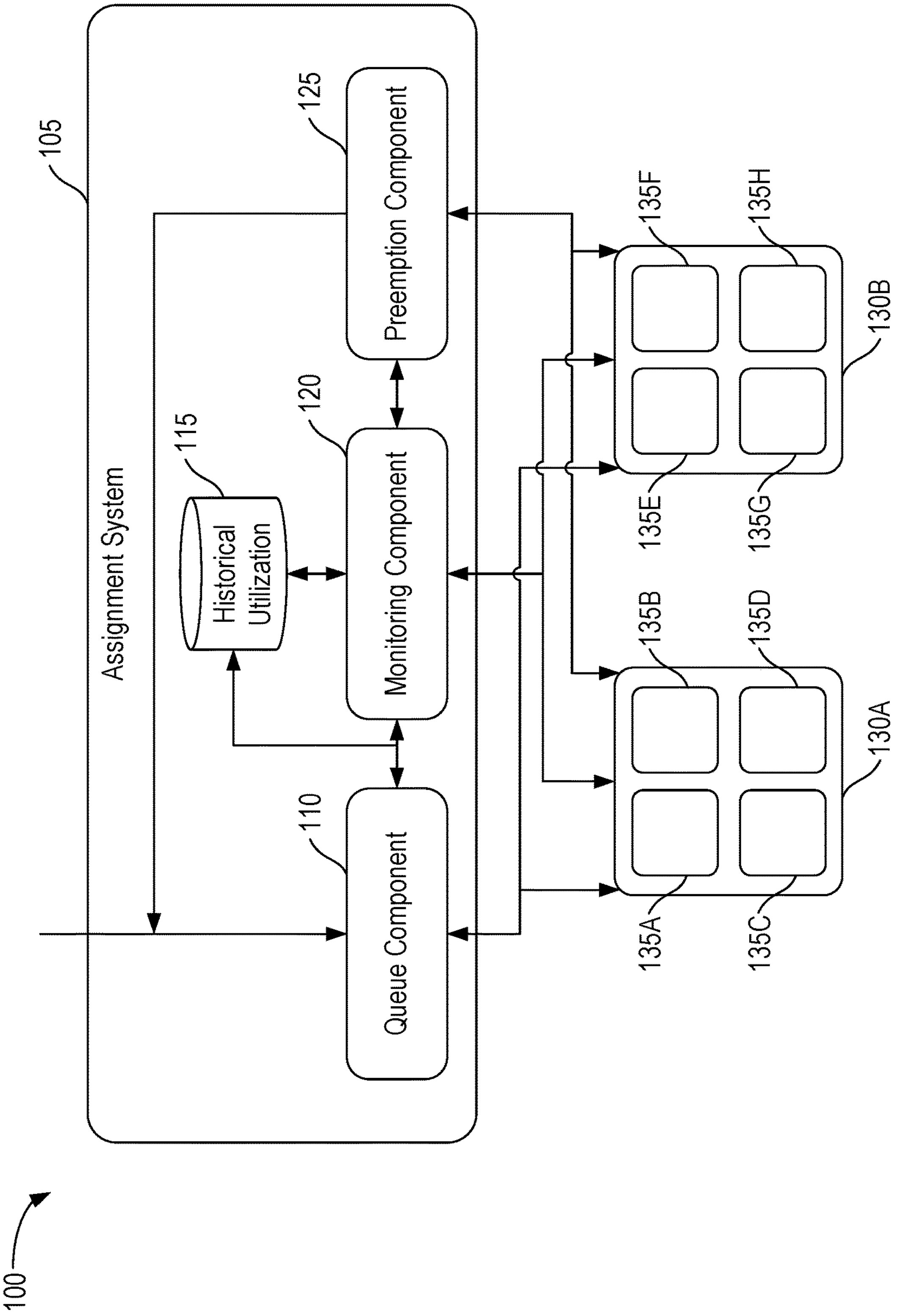
FIG. 1 depicts an example architecture for computing resource assignment in shared resource computing systems, according to some aspects of the present disclosure.

Aspects of the present disclosure provide apparatuses, methods, processing systems, and non-transitory computer-readable mediums for providing improved computing resource allocation. In some aspects, computing resources are allocated for machine learning jobs, such as for training machine learning models.

In some aspects of the present disclosure, requests can be received from any number of requesting entities (e.g., data scientists or other users, applications, systems, devices, and the like) for use of a shared set of resources. For example, a requesting entity may request that a provided dataset be processed using one or more GPUs of a GPU cluster. The available computing resources in the shared set can then be allocated to the computing operations (referred to in some aspects as "jobs") according to various criteria, such as priority, seniority (e.g., in a first-in first-out (FIFO) manner), resource availability, and the like.

As used herein, a "processor component" (also referred to in some aspects as a "processing component," a "processor unit," a "processing unit," a "computing unit," and/or simply a "unit") is generally representative of any shared computing resource (e.g., a single unit in a cluster of units), such as a GPU, a CPU, a tensor processing unit (TPU), a physics processing unit (PPU), a digital signal processor (DSP), a field-programmable analog array (FPAA), a neural processing unit (NPU), a neural signal processor (NSP), a neural network processor (NNP), an intelligence processing unit (IPU), a vision processing unit (VPU), a graph processing unit, a multimedia processing unit, and the like. In many cases, processor components include one or more processors capable of processing data, as well as some amount of available memory for storing input data, output data, and/or intermediate data during processing.

In many conventional systems, processor components are generally allocated or assigned as entire units. That is, a processing unit in the cluster may be assigned to a single job, and jobs do not generally share such units at the same time. In some conventional systems, a single job is given exclusive access until termination criteria are met (e.g., a defined amount of time, until the job is complete, and the like), and then use of the resource is passed to another separate job. However, many computing jobs do not use the entirety of the available resources. For example, though such processor components often have multiple processing cores, many jobs may use fewer cores than available (including a single core, in some cases). Similarly, smaller jobs may simply use fewer resources such as memory, computing time, or other resources than are available on even a single processor component.

Accordingly, if processor components are allocated to jobs on a one-to-one basis, available resources may be left unused, reducing efficiency and throughput. However, if multiple jobs share a processing unit at the same time, the system may suffer a wide variety of problems such as memory overflow, dramatic reductions in throughput of the processor component, and the like. Aspects of the present disclosure generally provide techniques to enable efficient resource allocation to computing jobs, including shared use of a single processor component (referred to in some aspects as packing multiple jobs), with reduced (or eliminated) risk of the shortcomings experienced by some conventional systems.

In some aspects of the present disclosure, machine learning training (MLT) operations are used as example computing jobs that can be effectively packed. As used herein, MLT generally refers to any training operation performed for any machine learning architecture, such as deep learning training (DLT), training shallow neural networks, training regression forests, training transformer architectures, and the like.

Generally, training for a wide variety of machine learning model architectures involves performing multiple iterations of processing data. Further, in addition to iterations within a single training session to generate a single trained model (e.g., iterating for each training sample one or more times during an iteration or epoch, as well as performing multiple such epochs), users often re-train models repeatedly. For example, users may train the model multiple times (each training operation involving a large number of iterations) with different hyperparameters, different labels, different training data, and the like. This may allow users to identify the top-performing models. However, such duplicative training similarly incurs duplicative costs.

In some aspects of the present disclosure, resource assignment systems (also referred to in some aspects as a job scheduler) can take advantage of certain common characteristics of MLT jobs to enable efficient packing on shared computing resources. For example, in some aspects, because MLT jobs are often recurring (e.g., performed repeatedly with the same or highly similar resource demands), the resource assignment system may generate historical trace information (e.g., historical utilization of the assigned computing resources) while any given job is executed. When the same job is subsequently received in the future, the assignment system can efficiently estimate the utilization the job will cause. Advantageously, requesting entities need not provide estimates of the resource usage (other than to request a number of processor components and/or specify a period of time), as the assignment system itself can predict the resource usage based on historical observations.

In some aspects, because resource usage of each given job is likely to be (relatively) stable across iterations (e.g., across requests for GPU time), the assignment system may efficiently pack the queued jobs. For example, based on determining (using historical trace information) that two jobs are unlikely to exceed the capacity of a single processor component, the assignment system may assign both of the jobs to execute on a single processor component simultaneously. This can substantially reduce waiting times for queued jobs, as well as substantially increase throughput of the resource cluster.

In some aspects, the assignment system can further monitor the packed jobs to verify whether the performance (e.g., throughput) of any executing jobs has degraded (e.g., to ensure that a reasonable job completion time is provided). In some such aspects, if a slowdown occurs (e.g., a newly assigned job begins to cause contention with an already-executing job, resulting in a slowdown for one or both jobs), the assignment system may preempt the newly assigned job, allowing the already-executing job to complete. In some aspects, the combination of jobs that caused the issue may be recorded such that the assignment system will not pack the same combination of jobs together in the future (e.g., because contention is likely to arise again).

In these ways, aspects of the present disclosure enable more MLT jobs to be executed at the same time, even with a limited number of processor components (e.g., GPUs), as compared to conventional systems using exclusive GPU allocation. This can substantially reduce the wait time for each job. Further, by utilizing historical trace information for the jobs, rather than a new and separate profiling stage of queued jobs, the overhead is significantly reduced. That is, while some conventional systems attempt to pack jobs based on an initial estimation of the resource usage, this estimation often incurs fairly substantial overhead and time. By using historical data, the assignment systems disclosed herein do not rely on a separate stage to profile to-be-packed jobs whenever a packing decision is made, which eliminates overhead and improves efficiency.

Moreover, using aspects of the present disclosure, requesting entities need not modify their training workload or training framework to enable resource sharing, nor do the requesting entities need to have any additional knowledge about the sharing (e.g., the requesting entities need not know what utilization their request may cause), as the assignment system can itself track this information. This makes the system transparent to requesting entities (e.g., users). Further, by monitoring the packed jobs, the assignment system can provide these and other improvements while also ensuring reasonable job completion time and preventing contention.

Example Architecture for Computing Resource Assignment in Shared Resource Computing Systems FIG. 1 depicts an example architecture 100 for computing resource assignment in shared resource computing systems, according to some aspects of the present disclosure.

In the illustrated example, an assignment system 105 receives computing jobs (e.g., MLT operations) and assigns or allocates computational resources (e.g., processor components 135A-H in one or more nodes or clusters 130A-B) to perform the jobs. Generally, the assignment system 105 is representative of a computing system (which may be implemented using hardware, software, or a combination of hardware and software) that manages use of a shared pool of computing resources (e.g., GPUs). For example, the assignment system 105 may be responsible for ensuring requested jobs are completed according to various priorities or targets without allowing executing jobs to interfere with each other.

In the illustrated example, the assignment system 105 includes a queue component 110, a monitoring component 120, a preemption component 125, and a database or repository of historical utilization 115 (also referred to in some aspects as historical resource utilization). Although discrete components are depicted for conceptual clarity, the operations of the depicted components (and others not illustrated) may be combined or distributed across any number of components and systems. Generally, as discussed in more detail below, the queue component 110 is responsible for dispatching jobs to the cluster for execution, the monitoring component 120 monitors executing jobs to track their utilization and/or status, the historical utilization 115 is a repository to store information related to the utilization of ongoing and/or completed jobs, and the preemption component 125 is used to preempt jobs that are executing but are interfering with one or more other jobs that are also executing.

The assignment system 105 manages use of processor components 135A-H in two clusters 130A-B. Although two clusters 130A-B are depicted, there may be any number of clusters or nodes managed by the assignment system 105. Further, though each cluster 130 includes four processor components 135 in the illustrated example, there may be any number of processor components 135 in a given cluster. As discussed above, the processor components 135 are generally representative of any processor, such as GPUs, NPUs, CPUs, and the like.

In the illustrated architecture 100, job requests are received by the queue component 110. Generally, job requests may be received from any number and variety of requesting entities (e.g., users, other software applications, other systems, and the like). A job request generally specifies the requested operations (e.g., what computing should be performed), and either includes or points to the relevant input data for the operations. For example, a request may provide training data and a machine learning model (e.g., the parameters of the model), and request various training operations be performed (e.g., processing the training data to generate predicted outputs, generating loss value(s) based on the predicted outputs and training labels, generating gradient(s) for backpropagation based on the loss(es), and/or generating updated parameter value(s) for the model based on the gradient(s)).

In some aspects, the job requests indicate the amount of resources that are requested. For example, a job request may request that four processor components 135 (e.g., GPUs) be used to execute the job. In some aspects, as discussed above, the request need not specify the expected utilization of those resources (e.g., the expected memory footprint).

In some aspects, when a job is submitted or requested, the queue component 110 enqueues the job into a queue. The queue component 110 may dequeue jobs from the queue to dispatch the job to the computing cluster for execution according to a variety of criteria. For example, in some aspects, the queue component 110 uses a FIFO queue where jobs are dispatched in the order the jobs are received by the assignment system 105. In some aspects, the queue component 110 may consider various other factors, such as if some jobs have higher priority than others. In some aspects, if the next job on the queue is too large to be allocated (e.g., insufficient resources are currently available), the queue component 110 may determine whether one or more other jobs in the queue can be dispatched. For example, if one processor component 135 is idle and the next job requests two processor components, the queue component 110 may determine whether any other jobs in the queue request a single processor component 135.

In the illustrated example, if there are sufficient resources available (e.g., one or more processor components 135 are idle), the queue component 110 may dispatch the newly received job immediately. As used herein, dispatching a job generally includes assigning or allocating one or more processor components to perform or execute the job, and initiating that execution. If no resources are idle, the queue component 110 may wait until additional resources become available (e.g., a currently executing job finishes) and the dispatch more job(s) from the queue.

In some aspects, if no processor components 135 are currently idle (e.g., all are currently executing one or more jobs), the queue component 110 may evaluate whether the next job to be dispatched (e.g., the next job in the queue) can be packed with any currently executing jobs on one or more processor components 135. In some aspects, the queue component 110 may evaluate the historical utilization 115 to determine or estimate the expected utilization of the to-be-dispatched job. For example, as discussed above, the queue component 110 may determine whether the same job has already been processed previously, and if so, may determine the prior resource utilization (e.g., the memory footprint of executing the job).

In some aspects, the queue component 110 may determine that the same job has been processed previously even if one or more aspects of the job change. For example, the parameters of the model may be different, the training data may be different, the hyperparameters may be different, and the like. In some aspect, the queue component 110 may determine that the same job was previously executed based on factors such as the name or label of the job, the requesting entity, the configuration or operations requested, and the like. For example, the assignment system 105 may search the historical utilization 115 for any records of prior execution of a job having the same name, received from the same requesting entity, to perform the same operations, and the like. In some aspects, the queue component 110 determines whether the same job was received recently (e.g., within a defined period of time) in order to determine whether the historical utilization 115 is valid or useful (e.g., where sufficiently old records may be considered untrustworthy). Generally, the particular analysis performed to recognize repeat jobs may vary depending on the particular implementation.

In the illustrated example, the queue component 110 may further query the monitoring component 120 and/or the historical utilization 115 to determine the utilization of one or more jobs that are currently executing on one or more processor components 135. For example, in some aspects, the queue component 110 determines the typical or estimated utilization of currently executing jobs based on the historical utilization 115. In some aspects, the queue component 110 may additionally or alternatively determine the current utilization of the currently executing jobs (e.g., as reported by the monitoring component 120).

In the depicted architecture 100, the queue component 110 may then determine whether the to-be-dispatched job can be packed (e.g., executed on the same processor component(s) 135) with one or more currently executing jobs. For example, the queue component 110 may determine whether the aggregate (e.g., the sum) of the expected utilization for the to-be-dispatched job and the expected or current utilization of an executing job is below the capacity of the processor component(s) 135 that are currently executing the executing job. If not, the new job may remain in the queue. If the combined utilization is below the capacity of the processor components 135, however, the queue component 110 may dispatch the job by assigning the specific processor components 135, such that both the new job and the already executing job are processed on the same processor component(s) 135 at the same time. In some aspects, to determine whether the processor component(s) 135 have capacity, the queue component 110 may include a defined amount of tolerance in the expected aggregate utilization (e.g., ensuring that the aggregate utilization is equal to or less than 95% of the capacity of the processor component(s) 135).

In some aspects, as discussed above, the monitoring component 120 may then begin monitoring the newly dispatched job, as well as continuing to monitor the already executing job(s). In some aspects, monitoring the job(s) includes monitoring the resource utilization of each job during execution (e.g., the compute cycles, memory footprint, and the like). In some aspects, monitoring the job(s) includes monitoring the throughput of each job (e.g., how many operations per second or minute are completed, such as how many training exemplars per second are processed). This utilization and/or throughput may be stored in the repository of historical utilization 115 (along with a label indicating the corresponding job), as discussed above. For example, after a job completes, the monitoring component 120 may generate a new record in the historical utilization, label the record to indicate the job that completed, and add information such as the resource utilization (e.g., the total or average memory footprint of the job), the throughput of the job (e.g., the number of operations per second completed, or the total execution time of the job), and the like.

In the illustrated example, when a new job (e.g., "Job A") is packed with one or more already executing jobs (e.g., "Job B"), the preemption component 125 may monitor the throughput of the already executing job(s) (e.g., Job B) to ensure that packing Job A does not cause contention to the already executing operations. For example, the preemption component 125 may verify whether the throughput of Job B has reduced relative to the throughput of Job B before Job A execution began. In some aspects, the preemption component 125 monitors for any reduction in throughput. In some aspects, the preemption component 125 may determine whether the reduction in throughput satisfies one or more criteria. For example, the preemption component 125 may determine whether the throughput has dropped a threshold amount (e.g., a static threshold such as "ten fewer instructions per second) and/or a dynamic threshold such as "10% less throughput"). In some aspects, the throughput criteria are job-specific (e.g., where a job with higher execution priority may have a lower threshold of allowable contention, while a job having lower priority may have a higher threshold of allowable contention).

In the depicted architecture 100, if the preemption component 125 determines that the throughput of the already executing job(s) (Job B) fails to satisfy the criteria (e.g., the throughput has dropped more than the allowable threshold), the preemption component 125 may preempt the newly dispatched job (Job A). That is, the preemption component 125 may stop execution the newly dispatched job, allowing the already executing job(s) to regain their prior use of the processor component(s) 135. In the illustrated example, the preemption component 125 may enqueue the preempted job back onto the queue (e.g., may provide the job request back to the queue component 110). In some aspects, the preempted job is placed at the front of the queue (e.g., such that the preempted job will be the next-dispatched job when resources become available).

In some aspects, when a job is preempted, the preemption component 125 may generate a record, label, or flag indicating that the combination of jobs (e.g., the preempted job (Job A) and the already executing job(s) (Job B)) is impermissible or not allowable (e.g., to indicate that the jobs should not be assigned to share a processor component in the future). This may include, for example, generating a record indicating the combination, and storing the record in a repository of combinations that should be avoided. In some aspects, the preemption component 125 may additionally or alternatively add a label indicating the executing job(s) (Job B) to the record for the preempted job (Job A) in the historical utilization 115, and/or add a label indicating the preempted job (Job A) to the record for the executing job(s) (Job B) in the historical utilization 115.

In this way, when either job is received again in the future, the queue component 110 can determine that the two jobs are not candidates to be packed together, as these jobs will likely cause contention to each other again. For example, when making a packing decision for either job, the queue component 110 may eliminate from consideration any processor component(s) 135 that are already executing the other job.

In these ways, the assignment system 105 can efficiently pack jobs using shared resources (e.g., shared processor components 135), which can substantially improve the overall throughput of the clusters 130A-B, reducing wait time for queued jobs and generally improving the operations of the shared resources (while also ensuring that the packed jobs do not interfere with each other).

Example Workflow for Computing Resource Assignment in Shared Resource Computing Systems FIGS. 2A, 2B, 2C, and 2D depict an example workflow 200A-D for computing resource assignment in shared resource computing systems, according to some aspects of the present disclosure.

Figure 2A:
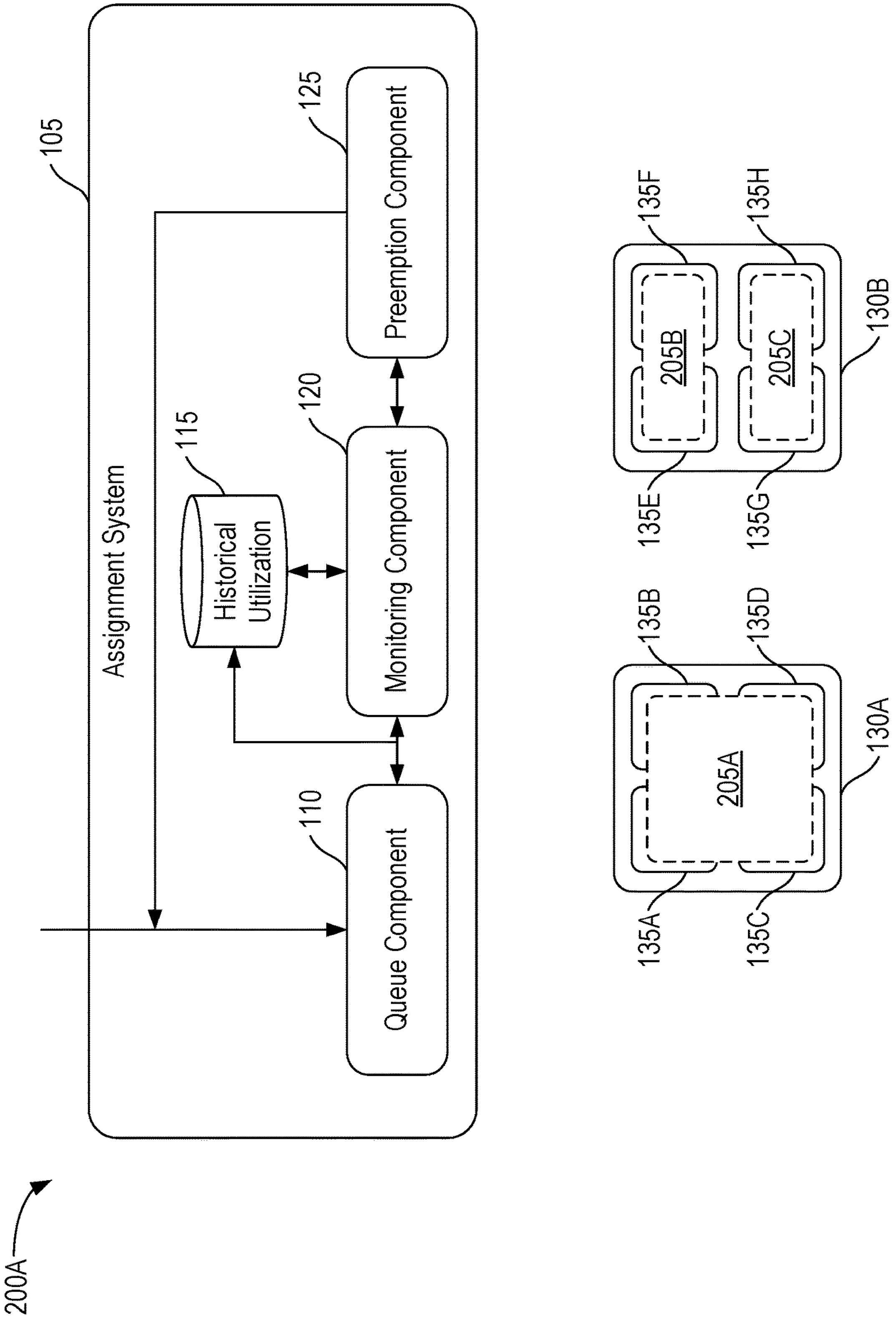
FIGS. 2A, 2B, 2C, and 2D depict an example workflow for computing resource assignment in shared resource computing systems, according to some aspects of the present disclosure.

As illustrated in FIG. 2A, the assignment system 105 has dispatched a number of computing jobs to execute on the clusters. Specifically, a computing job 205A is currently executing on four processor components 135A, 135B, 135C, and 135D of the cluster 130A. Further, a computing job 205B is currently executing on processor components 135E and 135F of the cluster 130B, and a computing job 205C is executing on the processor components 135G and 135H of the cluster 130B. In some aspects, as discussed above, the computing jobs 205 may correspond to MLT jobs (e.g., operations to train one or more machine learning models). Further, as discussed above, the computing jobs 205 may generally be received from any number and variety of requesting entities. When any computing job 205 completes, the results may be returned to the requesting entity.

Figure 2B:
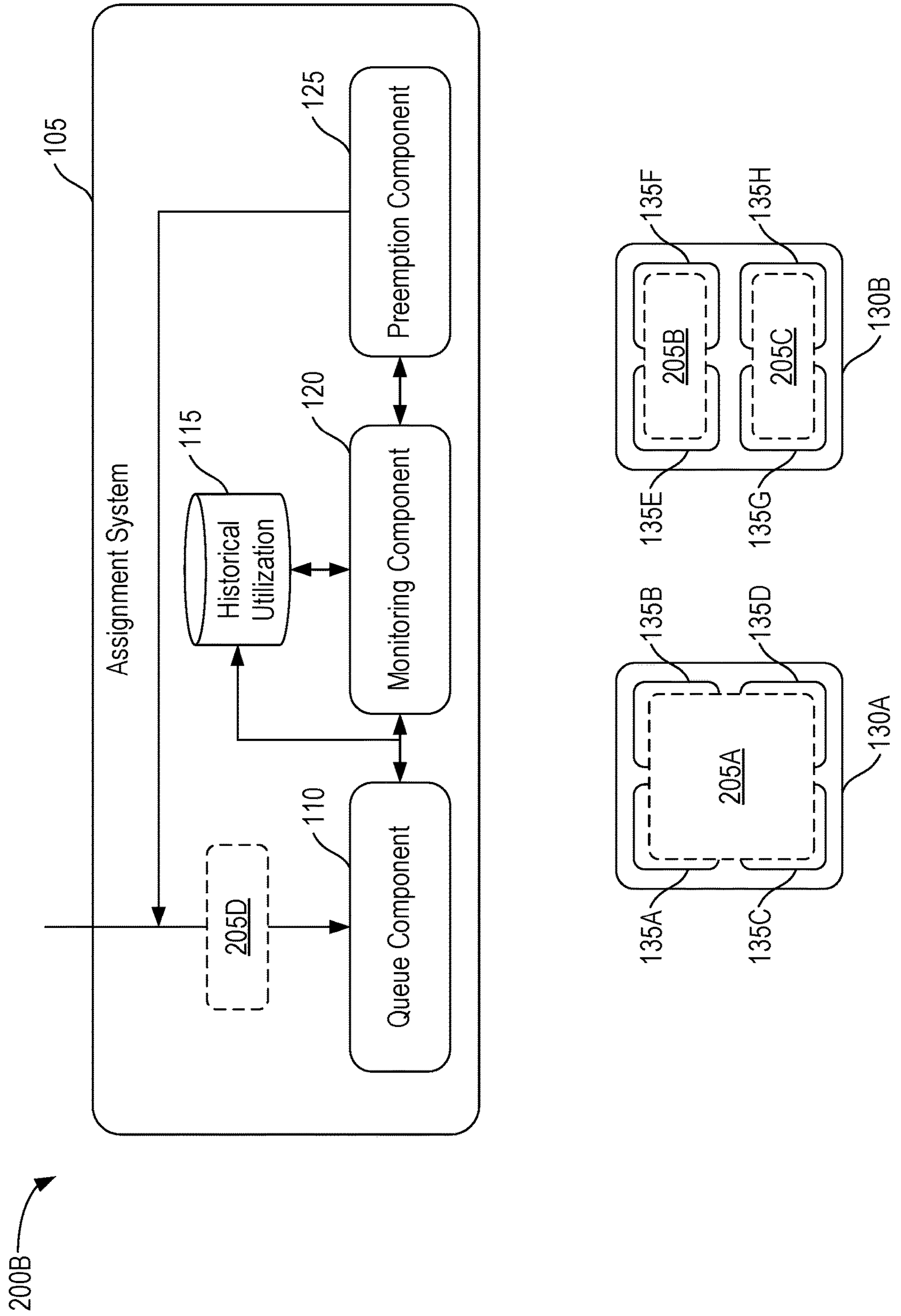

As illustrated in FIG. 2B, a new computing job 205D is received by the assignment system 105, and is provided to the queue component 110. As discussed above, the queue component 110 may determine that there are no currently idle processor components 135. In response, the queue component 110 may evaluate the historical utilization 115 and/or the current utilization of the executing computing jobs 205A-C to determine whether the new computing job 205D can be packed with any of the currently executing jobs.

For example, in some aspects, the queue component 110 may search the historical utilization 115 to determine whether historical data is available for the computing job 205D. In some aspects, if no such data is available (e.g., the computing job 205D has never been executed before, or at least a threshold duration of time has passed since the last time the computing job 205D was executed), the queue component 110 may retain the computing job 205D on the queue, refraining from packing the computing job 205D with any executing computing jobs 205A-C. When one or more currently executing computing jobs 205A-C complete, the queue component 110 may dispatch the computing job 205D to the newly available resources.

In some aspects, if historical utilization information for the computing job 205D is available, the queue component 110 may further determine the utilization of the currently executing computing jobs 205A-C (which may include the historical utilization and/or the current utilization). The queue component 110 may then select one or more of the currently executing computing jobs 205A-C, and determine whether the computing job 205D can be packed with the executing computing job(s). For example, as discussed above, the queue component 110 may sum the expected utilization of the computing job 205D with the utilization of each already executing computing job 205A-C, and determine whether the sum is equal to or less than the capacity of the relevant processor component(s) 135. In some aspects, as discussed above, the queue component 110 may build in a buffer to ensure that at least some spare capacity remains.

In some aspects, to select the computing job(s) 205A-C with which to pack the computing job 205D, the queue component 110 may use a variety of criteria. For example, in some aspects, the queue component 110 may evaluate any label(s) or flag(s) associated with the computing job 205D to see if there are any disallowable combinations (e.g., indicating that the computing job 205D should not be packed with the computing job 205C). Similarly, the queue component 110 may evaluate any label(s) or flag(s) associated with the currently executing computing jobs 205A-C that indicate the computing job 205D should not be packed with the executing job. As another example, the assignment system may access a repository of combinations to avoid, and determine whether there are any records indicating that the computing job 205D should not be executed with any other computing jobs.

In some aspects, the queue component 110 selects the computing job 205A-C with the lowest current utilization (as long as there are no flags indicating that the jobs should not be combined). This approach may improve the probability that the new computing job 205D can be packed, as this approach reduces the likelihood that the packed jobs will exceed the capacity of the processor component(s) 135. In some aspects, the queue component 110 may select the computing job 205A-C having the highest current utilization that, when summed with the utilization of the computing job 205D, remains below the capacity of the processor components 135 (potentially with some buffer).

For example, suppose the computing job 205D is expected to consume 40% of the available memory of a processor component 135, the computing job 205A consumes 70% of the available memory, the computing job 205B consumes 50% of the memory, and the computing job 205C consumes 30% of the memory. In some aspects, the queue component 110 may assign the computing job 205D to the processor components 135G and 135H based on determining that the computing job 205C has the lowest utilization. In other aspects, the queue component 110 may assign the computing job 205D to the processor components 135E and 135F based on determining that the computing job 205B has the highest utilization that still allows the packed jobs to remain under the maximum capacity. This may enable improved packing density and more efficient use of the processor components 135, in some aspects.

Figure 2C:
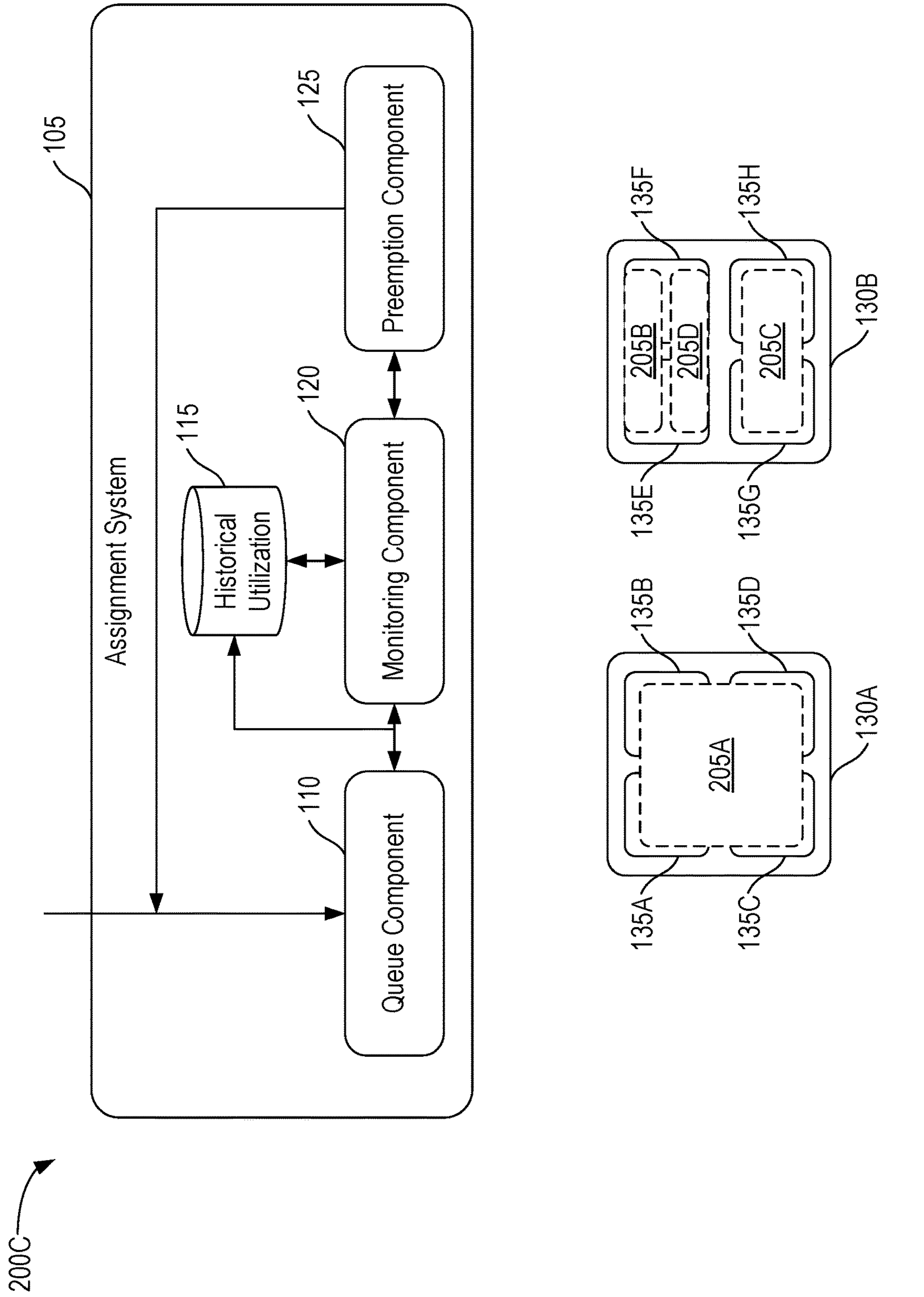

As illustrated in FIG. 2C, the queue component 110 has dispatched the computing job 205B to the processor components 135E and 135F. That is, the queue component 110 has packed the computing job 205D with the computing job 205B by assigning the processor components 135E and 135F to the computing job 205D (or, equivalently, by assigning the computing job 205D to the processor components 135E and 135F). In this way, the computing jobs 205B and 205D share the processor components 135E and 135F, each executing at the same time (e.g., on different cores, or alternating use of the same core(s)).

As discussed above, the monitoring component 120 and/or preemption component 125 may monitor the executing computing jobs 205A-D to determine characteristics such as utilization, throughput, and the like. This allows the monitoring component 120 to update the historical utilization 115 (to improve future packing decisions), as well as allowing the preemption component 125 to prevent or stop contention between computing jobs 205 that are using a shared processor component 135.

Figure 2D:
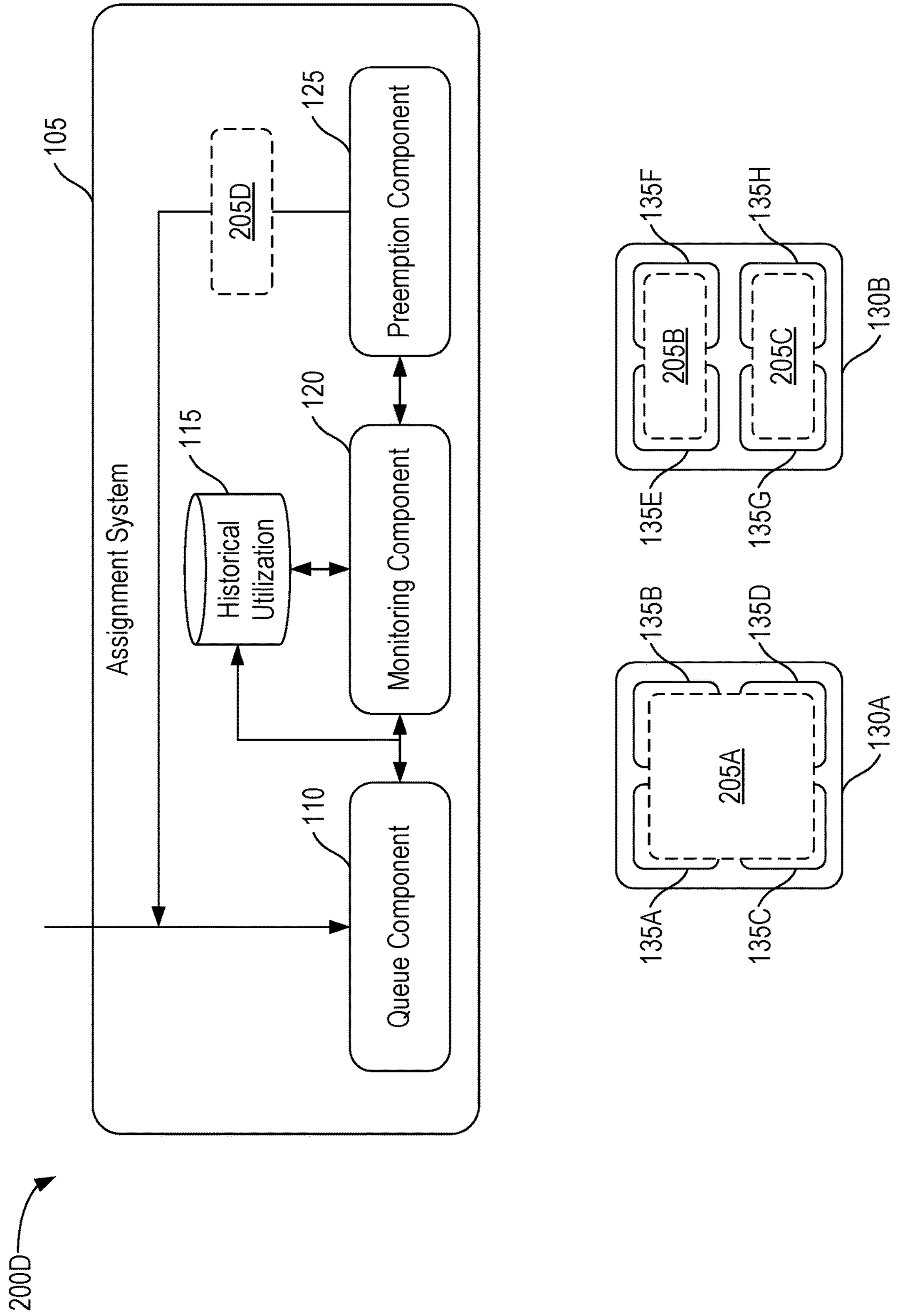

As illustrated in FIG. 2D, the preemption component 125 determined that the computing job 205D was causing contention to the computing job 205B. In some aspects, the preemption component 125 identified the contention by determining that the throughput of the computing job 205B dropped below an allowable threshold. For example, the preemption component 125 may determine that the throughput of the computing job 205B (when sharing the processor components 135E and 135F with the computing job 205D) was more than a threshold amount below the throughput of the computing job 205B before the computing job 205D began execution.

In some aspects, in addition to or instead of job throughput, the preemption component 125 may consider other factors such as resource utilization. For example, the preemption component 125 may monitor the aggregate utilization of the shared processor components 135 to ensure that the utilization remains below a threshold (e.g., below 95% of the maximum capacity). In some such aspects, relatively small fluctuations in the utilization of either packed job may cause the memory to overflow, which could cause data loss and/or could cause one or both computing jobs to crash. In some aspects, therefore, the preemption component 125 may preemptively terminate the new computing job 205D to ensure that the already executing computing job 205B is not interrupted.

In the illustrated example, the preemption component 125 returns the preempted computing job 205D to the queue component 110, and the queue component 110 enqueues the computing job 205D back onto the queue. In some aspects, as discussed above, the queue component 110 may replace the computing job 205D to the front of the queue, allowing the computing job 205D to be dispatched first when additional resources are available.

Example Method for Packing Jobs in Shared Resource Computing Systems

Figure 3:
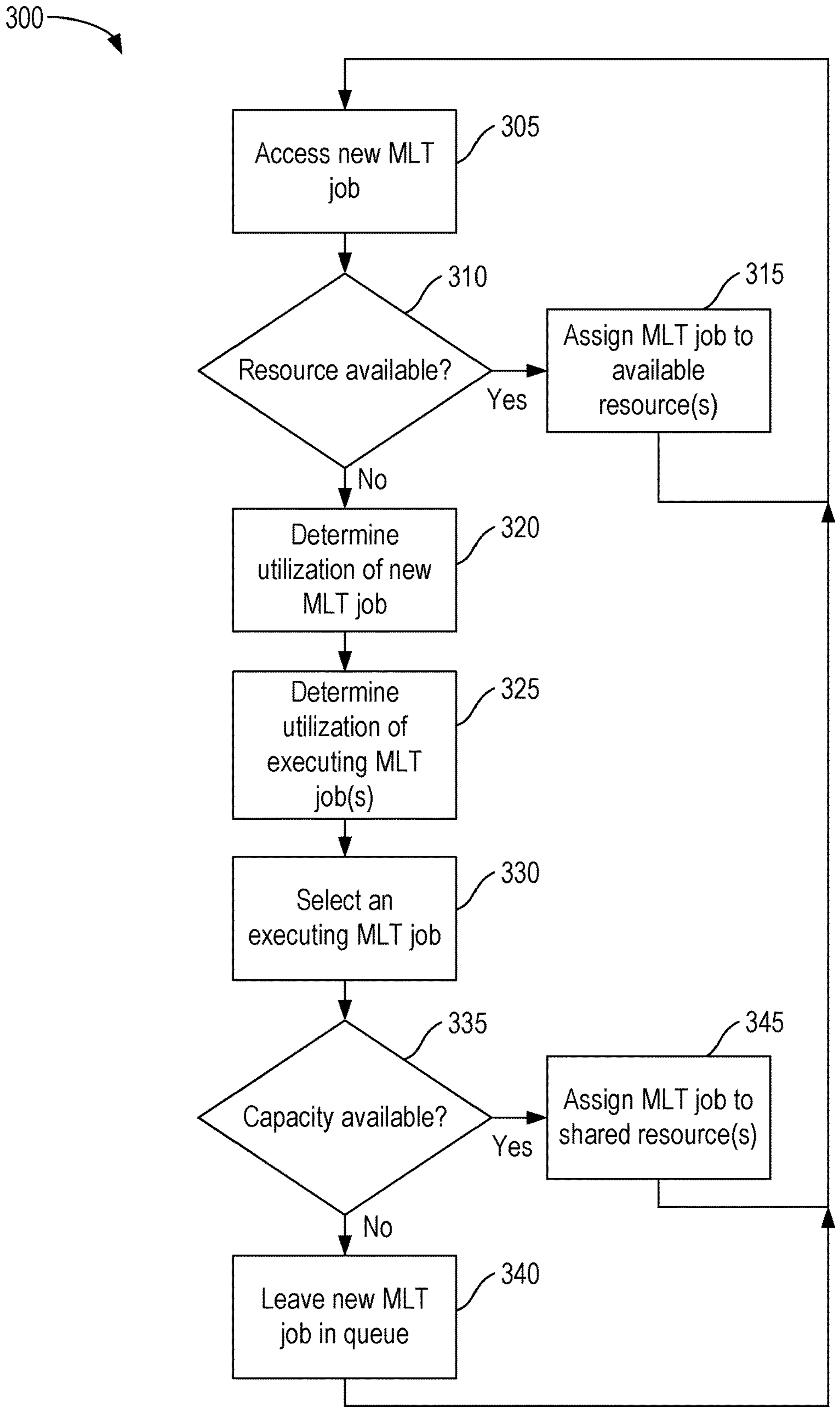
FIG. 3 is a flow diagram depicting an example method for packing jobs in shared resource computing systems, according to some aspects of the present disclosure.

FIG. 3 is a flow diagram depicting an example method 300 for packing jobs in shared resource computing systems, according to some aspects of the present disclosure. In some aspects, the method 300 is performed by an assignment system, such as the assignment system 105 of FIGS. 1 and 2A-2D.

At block 305, the assignment system accesses a new MLT job. As used herein, "accessing" data generally includes receiving, requesting, retrieving, collecting, obtaining, or otherwise gaining access to the data. In some aspects, as discussed above, the assignment system accesses the MLT job from a requesting entity (e.g., a data scientist). As discussed above, the new MLT job request may generally include any relevant information to execute the job. For example, the MLT job may specify the model being trained (e.g., providing the current set of parameters), hyperparameters to use to complete the job, the training data to use, the particular operations to perform, a location and/or format for the output data to be provided via, the number of iterations to perform, termination criteria, and the like. In some aspects, the MLT job is similarly associated with identifying information, such as a name, an identifier of the requesting entity, and the like. In some aspects, accessing the new MLT job includes dequeuing the MLT job from the queue (or identifying the job currently at the start of the queue, allowing the assignment system to evaluate the job for potential dispatch prior to dequeuing the job).

At block 310, the assignment system determines whether one or more resources are available to execute the newly received MLT job. In some aspects, as discussed above, the assignment system may determine whether one or more processor components (e.g., processor components 135 of FIGS. 1 and 2A-2D) are currently idle. For example, if the assignment system is allocating GPUs in a cluster, the assignment system may check whether any GPUs are currently idle (e.g., not processing a requested computing job), whether any core(s) of one or more GPU(s) are idle, and the like. In some aspects, the assignment system determines whether at least the indicated number of processor components (indicated with the MLT job request) are available.

If, at block 310, the assignment system determines that a sufficient number of processor component(s) are idle and available, the method 300 continues to block 315, where the assignment system assigns the new MLT job (received at block 305) to one or more of the idle processor components. The method 300 then returns to block 305.

If, at block 310, the assignment system determines that there are not sufficient idle processor component(s) to give the newly received MLT job exclusive access, the method 300 continues to block 320. At block 320, the assignment system determines the utilization of the newly received MLT job. For example, as discussed above, the assignment system may evaluate historical trace information (e.g., the historical utilization 115 of FIG. 1) to determine the prior resource utilization of the newly received job.

At block 325, the assignment system determines the current resource utilization of one or more currently executing MLT jobs (e.g., computing jobs that are currently being executed on one or more processor components of the assignment system). In some aspects, for example, the assignment system may evaluate the utilization of the current iteration (e.g., of the job as the job is currently executing). In some aspects, as discussed above, the assignment system may determine the current utilization based on the historical utilization information for the job (e.g., presuming that the current utilization is or will be similar to the historical utilization).

At block 330, the assignment system selects one of the currently executing MLT jobs. In some aspects, as discussed above, the assignment system selects the MLT job that has the lowest current utilization. In some aspects, as discussed above, the assignment system selects the MLT job that has the highest utilization which, when combined with the expected utilization of the new MLT job, will remain at or below the capacity of the processor component(s). In some aspects, the assignment system selects the MLT job with at least an element of randomness or pseudo-randomness (e.g., randomly selecting an MLT job if two or more are similar in terms of utilization). In some aspects, the assignment system may use a variety of other criteria to select the MLT job, such as for load balancing on the processor components, based on relative priorities of the executing jobs (e.g., refraining from packing new jobs with high priority executing jobs), and the like.

At block 335, the assignment system determines whether the processor components that are currently executing the selected MLT job have sufficient capacity to add the newly received MLT job. For example, as discussed above, the assignment system may aggregate (e.g., sum) the utilization of the new job (determined at block 320) and the utilization of the selected job (determined at block 325). If this aggregate utilization does not exceed the capacity of the processor component(s) that are currently executing the selected job (with or without a buffer, depending on the implementation), the method 300 continues to block 345.

At block 345, the assignment system assigns the newly received MLT job to the processor component(s) that are currently executing the selected MLT job. As discussed above, the new job and the existing job may then share the resources moving forward (e.g., each using different portions of the memory and using processing time in parallel (e.g., on different cores) and/or alternatively in sequence). This sharing may continue until one job is preempted and/or until one job terminates, at which point the remaining job may have exclusive use of the processor component(s) (unless another job is allocated to share the resources). The method 300 then returns to block 305.

Returning to block 335, if the assignment system determines that there is insufficient capacity available for the new job, the method 300 continues to block 340, where the assignment system leaves the new MLT job in the queue (or returns the new job to the queue, if the job was already dequeued). In this way, the assignment system can efficiently and safely pack computing jobs while preventing (or at least reducing) contention between executing jobs. In some aspects, as discussed below, the method 400 of FIG. 4 may be performed in parallel with the method 300 in order to monitor the ongoing job executions to preempt such contention.

Example Method for Managing Packed Jobs in Shared Resource Computing Systems

Figure 4:
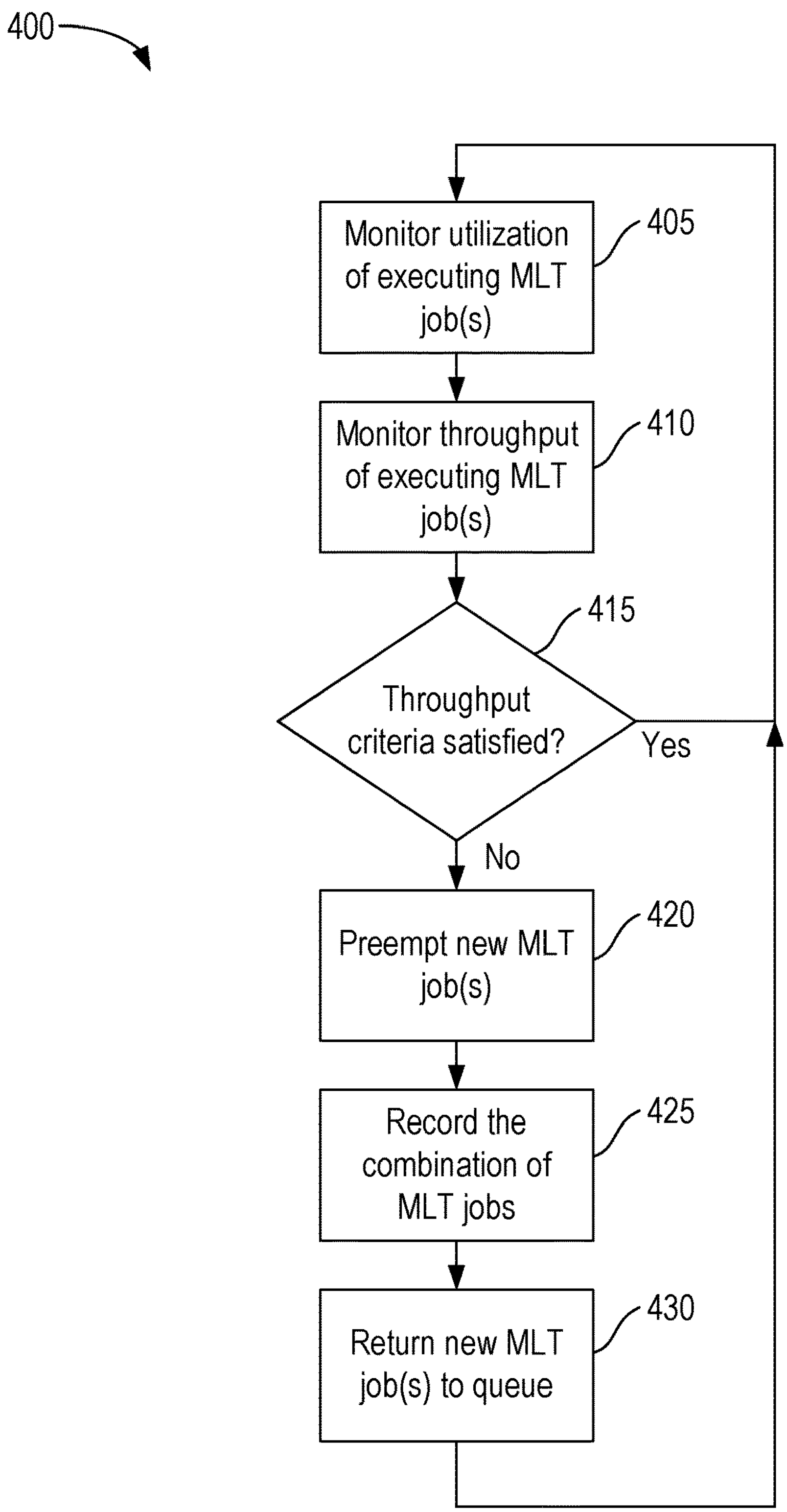
FIG. 4 is a flow diagram depicting an example method for managing packed jobs in shared resource computing systems, according to some aspects of the present disclosure.

FIG. 4 is a flow diagram depicting an example method 400 for managing packed jobs in shared resource computing systems, according to some aspects of the present disclosure. In some aspects, the method 400 is performed by an assignment system, such as the assignment system discussed above with reference to FIG. 3 and/or the assignment system 105 of FIGS. 1 and 2A-2D. In some aspects, the method 400 may be used in parallel with the method 300 of FIG. 3. For example, the method 300 may be used to allocate MLT jobs to computing resources, while the method 400 may be used to monitor those resources as they are used to execute the allocated jobs.

At block 405, the assignment system monitors utilization of each MLT job that is currently executing on the assignment system. For example, as discussed above, the assignment system may monitor the memory usage of each job, the processor usage of each job, and the like. In some aspects, the assignment system monitors the utilization relatively continuously, such as at discrete points (e.g., ten times per second). In some aspects, as discussed above, the assignment system may update a repository of historical utilization (e.g., the historical utilization 115 of FIG. 1) based on the monitoring. For example, the assignment system may update the historical information to indicate, for each currently executing job, the utilization at one or more points during execution, the minimum utilization during execution, the maximum utilization during execution, the average utilization during execution, and the like.

At block 410, the assignment system monitors throughput of each MLT job that is currently executing on the assignment system. For example, as discussed above, the assignment system may monitor the number of operations per second that each job performs, the number of inputs per second processed for each job, the number of outputs generated per second by each job, and the like. In some aspects, the assignment system monitors the throughput relatively continuously, such as at discrete points (e.g., ten times per second). In some aspects, as discussed above, the assignment system may update a repository of historical information (e.g., the historical utilization 115 of FIG. 1) based on the monitoring. For example, the assignment system may update the historical information to indicate, for each currently executing job, the throughput at one or more points during execution, the minimum throughput during execution, the maximum throughput during execution, the average throughput during execution, and the like.

At block 415, the assignment system determines whether one or more throughput criteria are satisfied. As discussed above, in some aspects, the throughput criteria corresponds to a minimum allowable throughput for any pre-existing jobs, where a pre-existing job is a job that was already executing before a new job was packed onto the same processor component(s). For example, if Job A is currently executing and Job B is packed onto the same hardware, then Job A may be referred to as a pre-existing job, while Job B is a new or potentially preemptible job. Further, if Job C is subsequently packed onto the same hardware, then Job B may be a pre-existing job relative to Job C.

In some aspects, as discussed above, the throughput criteria relate to a minimum allowable throughput and/or a maximum allowable reduction in throughput. For example, the criteria may specify that the throughput should remain at or above a defined absolute level. As another example, the criteria may specify that the throughput reduction (e.g., the difference between the current throughput and the throughput prior to packing the new job(s)) should remain below a threshold amount or percentile. In some aspects, as discussed above, the particular throughput threshold(s) may vary depending on the particular implementation (and, in some aspects, the thresholds may vary depending on the particular job, such as based on job priority).

If, at block 415, the assignment system determines that the criteria are satisfied (e.g., the pre-existing or more senior jobs are not experienced contention that exceeds the criteria), then the method 400 returns to block 405. If, at block 415, the assignment system determines that the criteria are not satisfied (e.g., at least one pre-existing job has suffered contention that exceeds the criteria), then the method 400 continues to block 420.

At block 420, the assignment system preempts the new MLT job(s) that are causing the contention to the pre-existing job(s). For example, continuing the above example, if Job A and/or Job B are experiencing contention, the assignment system may preempt Job C. Similarly, if Job A is still experiencing contention, the assignment system may then preempt Job B. Generally, preempting the new MLT job(s) corresponds to ceasing or stopping execution of less senior job(s) that are consuming processor component resources which could be allocated to more senior job(s) using the same shared resources.

At block 425, the assignment system records or stores an indication of the combination of MLT jobs to avoid assigning such jobs to shared processor component(s). For example, the assignment system may record the combination as an impermissible, disallowable, or non-preferred combination of jobs to pack together. That is, the assignment system labels the preempted (new) job and the pre-existing (more senior) job as a disallowed combination, such that these particular jobs cannot or should not be executed on shared hardware. For example, as discussed above, the assignment system may add a flag or label to the historical usage information to indicate that the preempted job should not be executed on the same processor component(s) as the pre-existing job(s), and/or that the pre-existing job(s) should not be executed on the same processor component(s) as the preempted job. In some aspects, the assignment system generates a separate record or label indicating both the MLT jobs (e.g., in a separate repository of combinations that should be avoided).

At block 430, the assignment system returns the new (preempted) MLT job(s) to the queue. As discussed above, in some aspects, the assignment system places the preempted job(s) at the start of the queue, such that the preempted job(s) are considered next for potential dispatch (e.g., prior to considering any additional job(s) in the queue that were received after the preempted job was received). The method 400 then returns to block 405.

Example Method for Assigning Computing Resources

Figure 5:
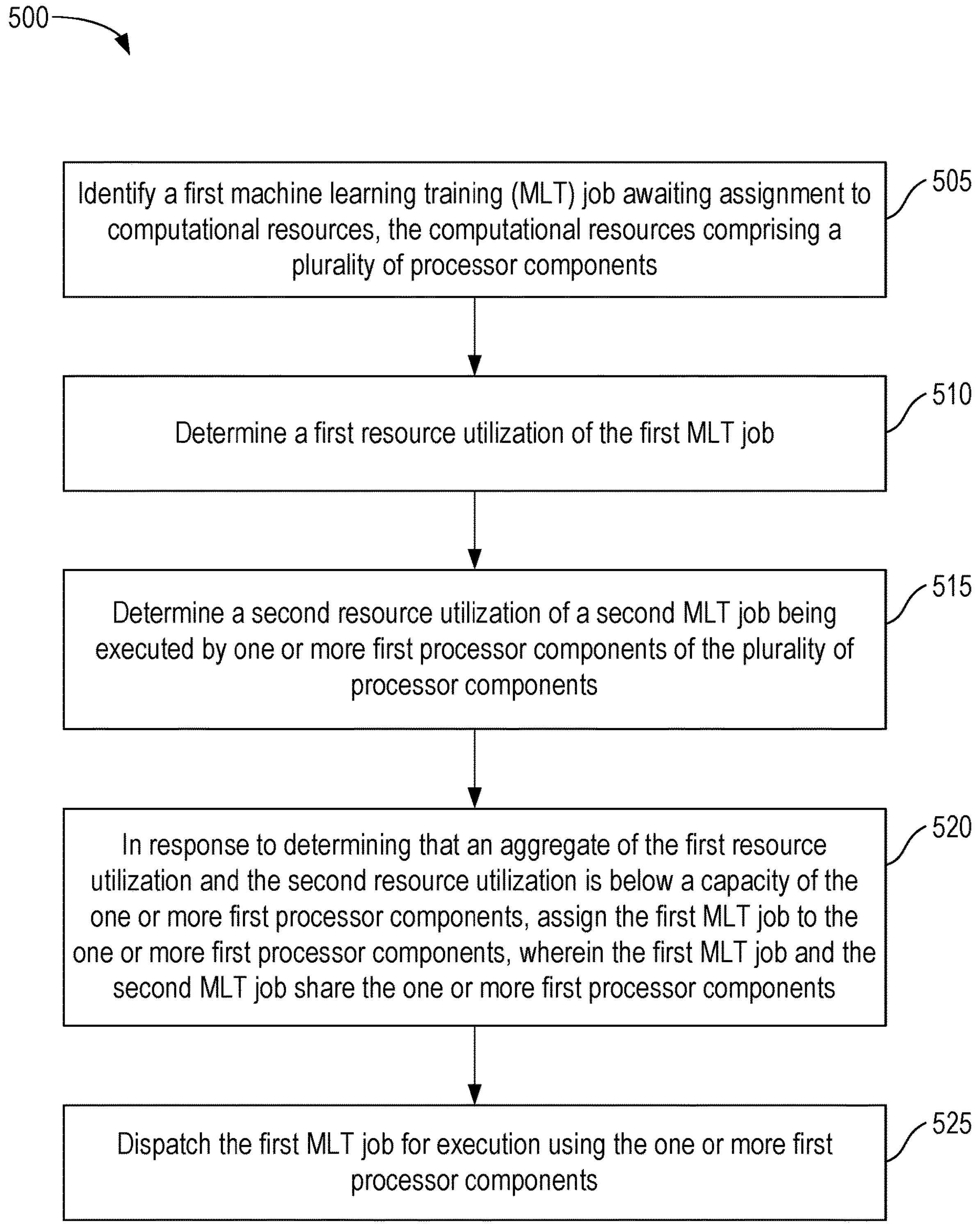
FIG. 5 is a flow diagram depicting an example method for assigning computing resources, according to some aspects of the present disclosure.

FIG. 5 is a flow diagram depicting an example method 500 for assigning computing resources, according to some aspects of the present disclosure. In some aspects, the method 500 is performed by an assignment system, such as the assignment system discussed above with reference to FIGS. 3-4 and/or the assignment system 105 of FIGS. 1 and 2A-2D.

At block 505, a first MLT job awaiting assignment to computational resources is identified, the computational resources comprising a plurality of processor components.

At block 510, a first resource utilization of the first MLT job is determined.

At block 515, a second resource utilization of a second MLT job being executed by one or more first processor components of the plurality of processor components is determined.

At block 520, in response to determining that an aggregate of the first resource utilization and the second resource utilization is below a capacity of the one or more first processor components, the first MLT job is assigned to the one or more first processor components, wherein the first MLT job and the second MLT job share the one or more first processor components.

At block 525, the first MLT job is dispatched for execution using the one or more first processor components.

In some aspects, determining the second resource utilization is performed in response to determining that all of the plurality of processor components are currently executing one or more MLT jobs.

In some aspects, the method 500 further includes identifying a third MLT job awaiting assignment to computational resources, and, in response to determining that at least one processor component of the plurality of processor components is not executing one or more MLT jobs, assigning the third MLT job to the at least one processor component.

In some aspects, assigning the first MLT job to the one or more first processor components is performed at least in part in response to determining that the second resource utilization is a lowest current utilization of the plurality of processor components.

In some aspects, determining the first resource utilization comprises accessing historical resource utilization for the first MLT job.

In some aspects, the method 500 further includes recording, during execution of the first MLT job using the one or more first processor components, resource utilization of the first MLT job.

In some aspects, the method 500 further includes monitoring, during execution of the first MLT job and the second MLT job using the one or more first processor components, a throughput of the second MLT job, and determining whether to stop execution of the first MLT job based on the throughput.

In some aspects, determining whether to stop execution of the first MLT job comprises stopping execution of the first MLT job in response to determining that the throughput does not satisfy one or more criteria.

In some aspects, the method 500 further includes adding the first MLT job to a queue for MLT jobs awaiting assignment to computational resources.

In some aspects, the method 500 further includes labeling a combination of the first MLT job and the second MLT job to avoid being assigned to a shared processor component.

In some aspects, determining whether to stop execution of the first MLT job comprises continuing execution of the first MLT job in response to determining that the throughput satisfies one or more criteria.

In some aspects, the plurality of processor components comprises a plurality of graphics processing units (GPUs).

In some aspects, the first resource utilization indicates a memory usage of the first MLT job during execution.

Example Processing System for Computing Resource Assignment

Figure 6:
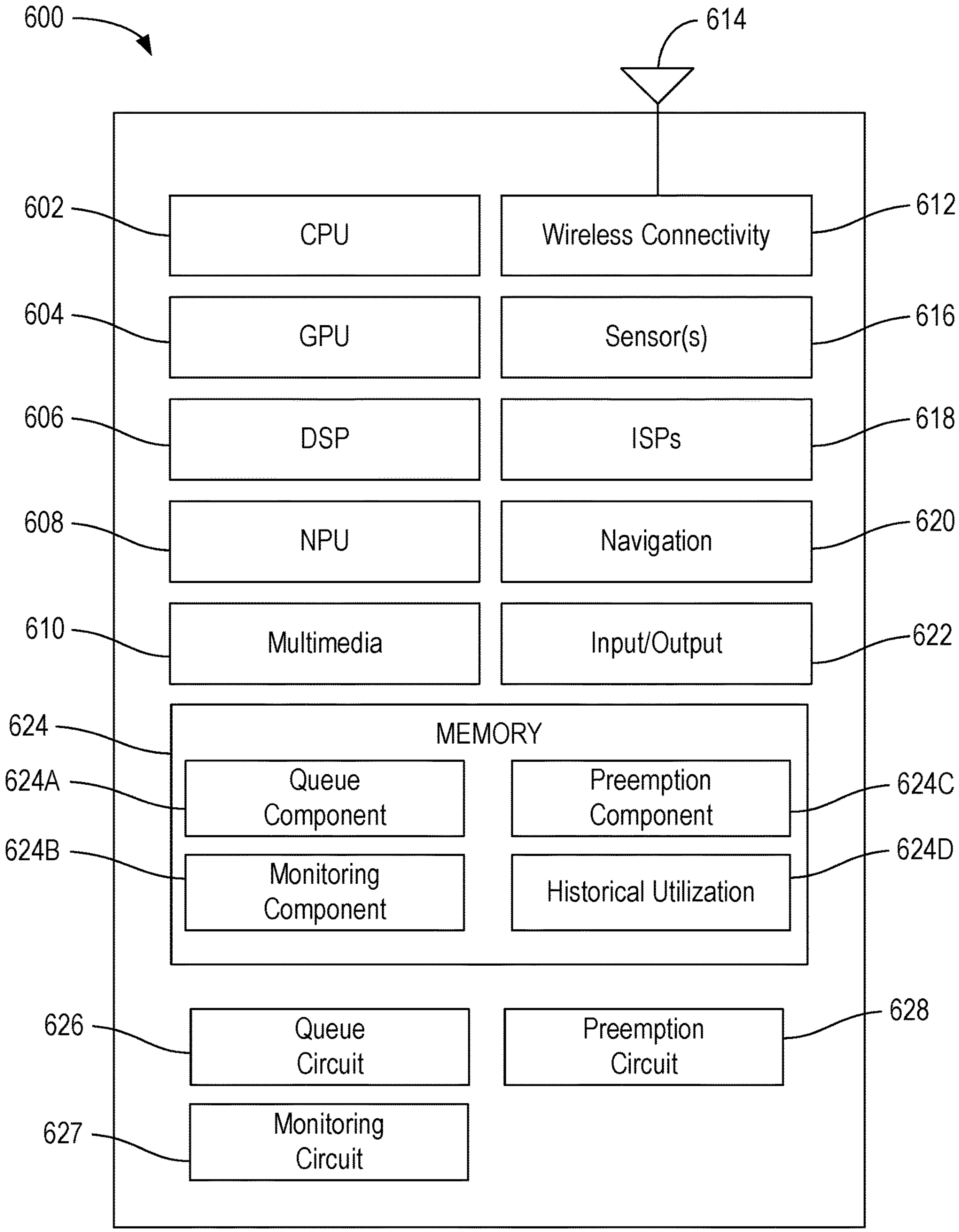
FIG. 6 depicts an example processing system configured to perform various aspects of the present disclosure.

FIG. 6 depicts an example processing system 600 configured to perform various aspects of the present disclosure, including, for example, the techniques and methods described with respect to FIGS. 1-6. In some aspects, the processing system 600 may correspond to an assignment system. For example, the processing system 600 may correspond to the assignment system discussed above with reference to FIGS. 3-5 and/or the assignment system 105 of FIGS. 1 and 2A-2D. Although depicted as a single system for conceptual clarity, in some aspects, as discussed above, the operations described below with respect to the processing system 600 may be distributed across any number of devices or systems.

The processing system 600 includes a central processing unit (CPU) 602, which in some examples may be a multi-core CPU. Instructions executed at the CPU 602 may be loaded, for example, from a program memory associated with the CPU 602 or may be loaded from a memory partition (e.g., a partition of a memory 624).

The processing system 600 also includes additional processor components tailored to specific functions, such as a graphics processing unit (GPU) 604, a digital signal processor (DSP) 606, a neural processing unit (NPU) 608, a multimedia component 610 (e.g., a multimedia processing unit), and a wireless connectivity component 612.

An NPU, such as the NPU 608, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 608 is a part of one or more of the CPU 602, the GPU 604, and/or the DSP 606.

In some examples, the wireless connectivity component 612 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 612 is further coupled to one or more antennas 614.

The processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

The processing system 600 may also include one or more input and/or output devices 622, such as screens, touch-sensitive surfaces (including touch-sensitive displays), physical buttons, speakers, microphones, and the like.

In some examples, one or more of the processors of the processing system 600 may be based on an ARM or RISC-V instruction set.

The processing system 600 also includes a memory 624, which is representative of one or more static and/or dynamic memories, such as a dynamic random access memory, a flash-based static memory, and the like. In this example, the memory 624 includes computer-executable components, which may be executed by one or more of the aforementioned processors of the processing system 600.

In particular, in this example, the memory 624 includes a queue component 624A, a monitoring component 624B, and a preemption component 624C. Though depicted as discrete components for conceptual clarity in FIG. 6, the illustrated components (and others not depicted) may be collectively or individually implemented in various aspects.

As illustrated, the memory 624 also includes a set of records of historical utilization 624D (e.g., the historical utilization 115 of FIG. 1). For example, the historical utilization 624D may include information about computing jobs that are currently executing and/or have been executed by the processing system 600, such as the utilization of such jobs, the throughput of such jobs, any disallowable combinations of such jobs, and the like.

The processing system 600 further comprises a queue circuit 626, a monitoring circuit 627, and a preemption circuit 628. The depicted circuits, and others not depicted (such as an inferencing circuit), may be configured to perform various aspects of the techniques described herein.

The queue component 624A and/or the queue circuit 626 (which may correspond to the queue component 110 of FIG. 1) may be used to control enqueuing, dequeuing, and dispatch of jobs from a queue, as discussed above. For example, the queue component 624A and/or the queue circuit 626 may be used to identify available resources, determine job utilization(s) to predict whether job(s) can be packed to one or more shared processor components, and the like. In some aspects, the queue component 624A and/or the queue circuit 626 may dispatch computing jobs to one or more processor components of the processing system 600, such as the CPU(s) 602, the GPU(s) 604, the DSP(s) 606, the NPU(s) 608, the multimedia component 610, the sensor processing unit(s) 616, the ISPs 618, and the like. In some aspects, the queue component 624A and/or the queue circuit 626 may dispatch computing jobs to one or more other processor components, such as an external cluster of GPUs.

The monitoring component 624B and/or the monitoring circuit 627 (which may correspond to the monitoring component 120 of FIG. 1) may be used to monitor the execution of ongoing computing jobs, as discussed above. For example, the monitoring component 624B and/or the monitoring circuit 627 may track the utilization of ongoing jobs and/or track the throughput of ongoing jobs, updating a repository of utilization information (e.g., the historical utilization 624D) based on the metrics.

The preemption component 624C and/or the preemption circuit 628 (which may correspond to the preemption component 125 of FIG. 1) may be used to evaluate computing job throughput to preempt new jobs if these new jobs cause contention, as discussed above. For example, the preemption component 624C and/or the preemption circuit 628 may compare the current throughput of each pre-existing executing job to one or more thresholds and/or may determine the difference in throughput (e.g., between the current throughput and the throughput from prior to when a new job was packed to the same hardware) to one or more thresholds. In some aspects, as discussed above, if the throughput criteria are not met, then the preemption component 624C and/or the preemption circuit 628 may preempt the new job(s), returning these job(s) to the queue and labeling the combination as non-preferred.

Though depicted as separate components and circuits for clarity in FIG. 6, the queue circuit 626, the monitoring circuit 627, and the preemption circuit 628 may collectively or individually be implemented in other processing devices of the processing system 600, such as within the CPU 602, the GPU 604, the DSP 606, the NPU 608, and the like.

Generally, the processing system 600 and/or components thereof may be configured to perform the methods described herein.

Notably, in other aspects, aspects of the processing system 600 may be omitted, such as where the processing system 600 is a server computer or the like. For example, the multimedia component 610, the wireless connectivity component 612, the sensor processing units 616, the ISPs 618, and/or the navigation processor 620 may be omitted in other aspects. Further, aspects of the processing system 600 maybe distributed between multiple devices.

Example Clauses

Implementation examples are described in the following numbered clauses:

Clause 1: A method, comprising: identifying a first machine learning training (MLT) job awaiting assignment to computational resources, the computational resources comprising a plurality of processor components; determining a first resource utilization of the first MLT job; determining a second resource utilization of a second MLT job being executed by one or more first processor components of the plurality of processor components; in response to determining that an aggregate of the first resource utilization and the second resource utilization is below a capacity of the one or more first processor components, assigning the first MLT job to the one or more first processor components, wherein the first MLT job and the second MLT job share the one or more first processor components; and dispatching the first MLT job for execution using the one or more first processor components.

Clause 2: A method according to Clause 1, wherein determining the second resource utilization is performed in response to determining that all of the plurality of processor components are currently executing one or more MLT jobs.

Clause 3: A method according to Clause 2, further comprising: identifying a third MLT job awaiting assignment to computational resources; and in response to determining that at least one processor component of the plurality of processor components is not executing one or more MLT jobs, assigning the third MLT job to the at least one processor component.

Clause 4: A method according to any of Clauses 1-3, wherein assigning the first MLT job to the one or more first processor components is performed at least in part in response to determining that the second resource utilization is a lowest current utilization of the plurality of processor components.

Clause 5: A method according to any of Clauses 1-4, wherein determining the first resource utilization comprises accessing historical resource utilization for the first MLT job.

Clause 6: A method according to any of Clauses 1-5, further comprising recording, during execution of the first MLT job using the one or more first processor components, resource utilization of the first MLT job.

Clause 7: A method according to any of Clauses 1-6, further comprising: monitoring, during execution of the first MLT job and the second MLT job using the one or more first processor components, a throughput of the second MLT job; and determining whether to stop execution of the first MLT job based on the throughput.

Clause 8: A method according to Clause 7, wherein determining whether to stop execution of the first MLT job comprises stopping execution of the first MLT job in response to determining that the throughput does not satisfy one or more criteria.

Clause 9: A method according to any of Clauses 7-8, further comprising adding the first MLT job to a queue for MLT jobs awaiting assignment to computational resources.

Clause 10: A method according to any of Clauses 7-9, further comprising labeling a combination of the first MLT job and the second MLT job to avoid being assigned to a shared processor component.

Clause 11: A method according to Clause 7, wherein determining whether to stop execution of the first MLT job comprises continuing execution of the first MLT job in response to determining that the throughput satisfies one or more criteria.

Clause 12: A method according to any of Clauses 1-11, wherein the plurality of processor components comprises a plurality of graphics processing units (GPUs).

Clause 13: A method according to any of Clauses 1-12, wherein the first resource utilization indicates a memory usage of the first MLT job during execution.

Clause 14: A processing system comprising: a memory comprising computer-executable instructions; and one or more processors configured to execute the computer-executable instructions and cause the processing system to perform a method in accordance with any of Clauses 1-13.

Clause 15: A processing system comprising means for performing a method in accordance with any of Clauses 1-13.

Clause 16: A non-transitory computer-readable medium comprising computer-executable instructions that, when executed by one or more processors of a processing system, cause the processing system to perform a method in accordance with any of Clauses 1-13.

Clause 17: A computer program product embodied on a computer-readable storage medium comprising code for performing a method in accordance with any of Clauses 1-13.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word “exemplary” means “serving as an example, instance, or illustration.” Any aspect described herein as “exemplary” is not necessarily to be construed as preferred or advantageous over other aspects.

As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term “determining” encompasses a wide variety of actions. For example, “determining” may include calculating, computing, processing, deriving, investigating, looking up (e.g., looking up in a table, a database or another data structure), ascertaining, and the like. Also, “determining” may include receiving (e.g., receiving information), accessing (e.g., accessing data in a memory), and the like. Also, “determining” may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean “one and only one” unless specifically so stated, but rather “one or more.” Unless specifically stated otherwise, the term “some” refers to one or more. No claim element is to be construed under the provisions of 35 U.S.C. § 112(f) unless the element is expressly recited using the phrase “means for” or, in the case of a method claim, the element is recited using the phrase “step for.” All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:

one or more memories comprising processor-executable instructions; and one or more processors configured to execute the processor-executable instructions and cause the processing system to:

identify a first machine learning training (MLT) job awaiting assignment to computational resources, the computational resources comprising a plurality of processor components;

determine a first resource utilization of the first MLT job;

determine a second resource utilization of a second MLT job being executed by one or more first processor components of the plurality of processor components;

in response to determining that an aggregate of the first resource utilization and the second resource utilization is below a capacity of the one or more first processor components, assign the first MLT job to the one or more first processor components, wherein the first MLT job and the second MLT job share the one or more first processor components; and dispatch the first MLT job for execution using the one or more first processor components.

2. The processing system of claim 1, wherein the one or more processors are configured to execute the processor-executable instructions and cause the processing system to determine the second resource utilization is performed in response to determining that all of the plurality of processor components are currently executing one or more MLT jobs.

3. The processing system of claim 2, wherein the one or more processors are configured to further execute the processor-executable instructions and cause the processing system to:

identify a third MLT job awaiting assignment to computational resources; and in response to determining that at least one processor component of the plurality of processor components is not executing one or more MLT jobs, assign the third MLT job to the at least one processor component.

4. The processing system of claim 1, wherein the one or more processors are configured to execute the processor-executable instructions and cause the processing system to assign the first MLT job to the one or more first processor components at least in part in response to determining that the second resource utilization is a lowest current utilization of the plurality of processor components.

5. The processing system of claim 1, wherein, to determine the first resource utilization, the one or more processors are configured to execute the processor-executable instructions and cause the processing system to access historical resource utilization for the first MLT job.

6. The processing system of claim 1, wherein the one or more processors are configured to further execute the processor-executable instructions and cause the processing system to record, during execution of the first MLT job using the one or more first processor components, resource utilization of the first MLT job.

7. The processing system of claim 1, wherein the one or more processors are configured to further execute the processor-executable instructions and cause the processing system to:

monitor, during execution of the first MLT job and the second MLT job using the one or more first processor components, a throughput of the second MLT job; and determine whether to stop execution of the first MLT job based on the throughput.

8. The processing system of claim 7, wherein, to determine whether to stop execution of the first MLT job, the one or more processors are configured to execute the processor-executable instructions and cause the processing system to stop execution of the first MLT job in response to determining that the throughput does not satisfy one or more criteria.

9. The processing system of claim 8, wherein the one or more processors are configured to further execute the processor-executable instructions and cause the processing system to add the first MLT job to a queue for MLT jobs awaiting assignment to computational resources.

10. The processing system of claim 8, wherein the one or more processors are configured to further execute the processor-executable instructions and cause the processing system to label a combination of the first MLT job and the second MLT job to avoid being assigned to a shared processor component.

11. The processing system of claim 7, wherein, to determine whether to stop execution of the first MLT job, the one or more processors are configured to execute the processor-executable instructions and cause the processing system to continue execution of the first MLT job in response to determining that the throughput satisfies one or more criteria.

12. The processing system of claim 1, wherein the plurality of processor components comprises a plurality of graphics processing units (GPUs).

13. The processing system of claim 1, wherein the first resource utilization indicates a memory usage of the first MLT job during execution.

14. A processor-implemented method of computing resource allocation, comprising:

identifying a first machine learning training (MLT) job awaiting assignment to computational resources, the computational resources comprising a plurality of processor components;

determining a first resource utilization of the first MLT job;

determining a second resource utilization of a second MLT job being executed by one or more first processor components of the plurality of processor components;

in response to determining that an aggregate of the first resource utilization and the second resource utilization is below a capacity of the one or more first processor components, assigning the first MLT job to the one or more first processor components, wherein the first MLT job and the second MLT job share the one or more first processor components; and dispatching the first MLT job for execution using the one or more first processor components.

15. The processor-implemented method of claim 14, wherein determining the second resource utilization is performed in response to determining that all of the plurality of processor components are currently executing one or more MLT jobs.

16. The processor-implemented method of claim 15, further comprising:

identifying a third MLT job awaiting assignment to computational resources; and in response to determining that at least one processor component of the plurality of processor components is not executing one or more MLT jobs, assigning the third MLT job to the at least one processor component.

17. The processor-implemented method of claim 14, wherein assigning the first MLT job to the one or more first processor components is performed at least in part in response to determining that the second resource utilization is a lowest current utilization of the plurality of processor components.

18. The processor-implemented method of claim 14, further comprising:

monitoring, during execution of the first MLT job and the second MLT job using the one or more first processor components, a throughput of the second MLT job; and determining to stop execution of the first MLT job in response to determining that the throughput does not satisfy one or more criteria.

19. The processor-implemented method of claim 18, further comprising labeling a combination of the first MLT job and the second MLT job to avoid being assigned to a shared processor component.

20. A processing system, comprising:

means for identifying a first machine learning training (MLT) job awaiting assignment to computational resources, the computational resources comprising a plurality of processor components;

means for determining a first resource utilization of the first MLT job;

means for determining a second resource utilization of a second MLT job being executed by one or more first processor components of the plurality of processor components;

means for assigning, in response to determining that an aggregate of the first resource utilization and the second resource utilization is below a capacity of the one or more first processor components, the first MLT job to the one or more first processor components, wherein the first MLT job and the second MLT job share the one or more first processor components; and means for dispatching the first MLT job for execution using the one or more first processor components.

* * * * *